United States Patent [19]

Schluter et al.

[11] 4,030,786

[45] June 21, 1977

[54] MULTI-ROW ANTI-FRICTION BEARING

[75] Inventors: Wilhelm Schluter, Dortmund-Gartenstadt; Heinz Pohler, Herdecke-Kirchende, both of Germany

[73] Assignee: Hoesch Werke Aktiengesellschaft, Dortmund, Germany

[22] Filed: Jan. 5, 1976

[21] Appl. No.: 646,770

[30] Foreign Application Priority Data

Jan. 6, 1975  France ............................. 75.00268
Jan. 7, 1975  France ............................. 75.00381

[52] U.S. Cl. .............................. 308/227; 308/6 R; 308/174; 308/207 A
[51] Int. Cl.² .................. F16C 19/04; F16C 19/70
[58] Field of Search ........... 308/3.8, 3 A, 6 R, 216, 308/227, 230, 231, 174, 6 R, 227, 216

[56] References Cited

UNITED STATES PATENTS

| | | | |
|---|---|---|---|
| 3,361,500 | 1/1968 | Pohler | 308/216 |
| 3,802,755 | 4/1974 | Schluter et al. | 308/227 |
| 3,897,119 | 7/1975 | McMurtrie | 308/6 R |

*Primary Examiner*—Joseph F. Peters, Jr.
*Assistant Examiner*—Richard A. Bertsch
*Attorney, Agent, or Firm*—Walter Becker

[57] ABSTRACT

A multi-row anti-friction bearing for absorbing simultaneously occurring axial, radial, and torque loads, in which in a divided bearing ring there are provided a first and second or a first, second and third wire body each of which forms one raceway for the anti-friction elements, e.g. in the form of cylindrical rollers. In a non-divided bearing ring there is provided an additional wire body with two raceways and, if desired, a fifth wire body with one raceway only. With each raceway there cooperates one but a different anti-friction element, while the axes of rotation of both anti-friction elements, e.g. cylindrical rollers, cooperating with the two raceways of the additional wire body extend at a right angle to said last mentioned two raceways.

15 Claims, 5 Drawing Figures

FIG. 1
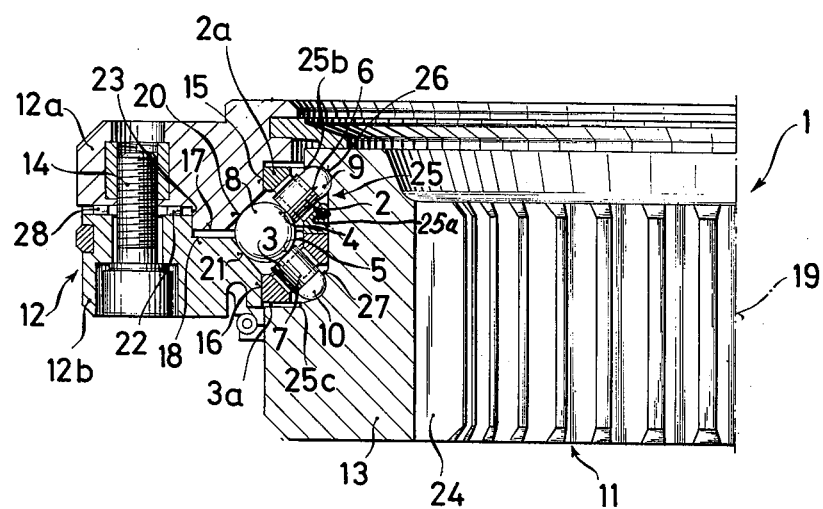
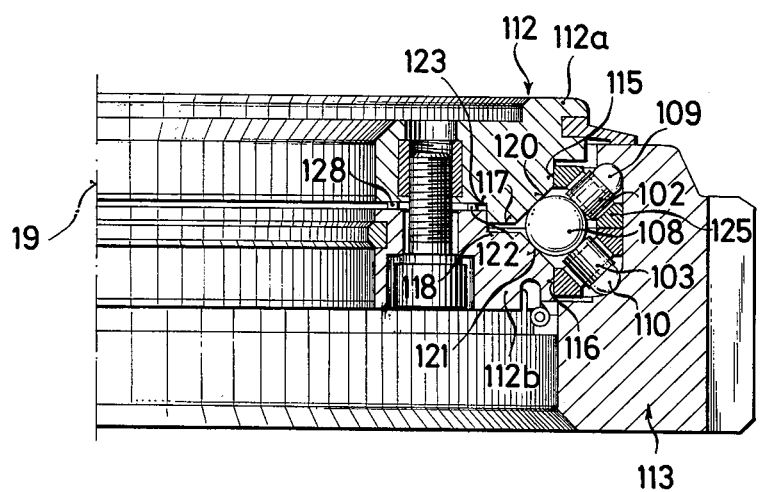
FIG. 2

MULTI-ROW ANTI-FRICTION BEARING

The present invention relates to an anti-friction being of great sturdiness for absorbing radial and axial forces a well as moment loads and comprises an inner bearing ring and an outer bearing ring with race ways for two rows of anti-friction elements. This anti-friction bearing has annular supporting wire bodies one of which has two race ways and is mounted on one of the two bearing rings. One of the two bearing rings is divided into two parts or sections which are axially arranged one above the other and respectively comprise the above mentioned race ways. The rows of anti-friction elements are respectively arranged in a cage between said race ways.

An anti-friction bearing of the above mentioned type has been disclosed in U.S. Pat. No. 3,802,755 Schluter et al. issued Apr. 9, 1974.

It is an object of the present invention so to modify an anti-friction bearing of the above mentioned general type that it will also serve as connection between a pivoting and swinging super-structure of a vehicle and the vehicle frame of welded construction composed of tempered steel. The requirements to be met by and problems encountered in connection with a bearing of this type consist in that it must be able to absorb constant axial and radial forces and also suddenly occurring forces such as moment loads. In this connection, it should be borne in mind that tensions or stresses generated or occurring when welding frame sections or during the operation of the vehicle have to be taken into consideration, and more specifically so that the resisting moment remains the same throughout the operation of the vehicle and even when the vehicle works in an inclined position. Moreover, the bearing must within the range of operation of the vehicle in operation be free from resonance.

It is another object of this invention so to design the anti-friction bearing set forth in the preceding paragraph that it will have as short a height as possible and will have its free central zone in the vicinity of its theoretical axis of rotation.

It is still another object of this invention to provide an anti-friction bearing as set forth above which will be simple in design and operation and will be self-centering when being mounted and during operation.

The above objects have been realized according to the present invention by providing that each of the two parts or sections making up the outer or inner race ring of the bearing has facing the other race ring part of a truncated surface which is coaxial with the bearing axis and tapers in the direction toward said other race ring part, and with the truncated surface of said other part forms a bi-truncated nest or seat for the wire body which is provided with two race ways, the planes of which are respectively parallel to one and the other of said truncated surfaces. The other bearing ring comprises, facing said nest or seat, an annular groove. Each of the junctions with rounded cross sections enters an annular face which is perpendicular to the bearing axis, and the cylindrical coaxial face of said groove is located opposite said truncated surface of that ring part which is farthest away from said groove face, and is provided with a wire body with a single race way.

Due to this invention, a multi-piece bearing is obtained which can be mounted in a preloaded condition or without play, on an infrastructure of the vehicle which structure has been built up with tempered structural elements and welded. Regardless of whether the welding stresses have been relieved or relieve themselves in the course of operation of the bearing and bring about a non-plane support for the dismountable connection of the inner race ring, these stresses are in particular relieved by the shocks occurring during the operation of the vehicle and act upon the upper race ring and by an inclined position of the vehicle. The resonance frequency of the rolling movement is constant and is outside the frequency range of the frequencies occurring during the operation of the vehicle.

The constancy of the torque or moment of resistance is assured by the fact that the rolling surfaces of the rolling elements such as the rollers in connection with the preloaded construction and without bearing play are always plane and circular. In this way, a post-adjustment which usually becomes necessary with the introduction of adjusting wedges or shims, or an adjustment by means of a spindle-operated adjusting device becomes unnecessary.

Assuming that the axis of rotation of the rolling elements is constant, any blockage thereof is avoided regardless of whether balls or rollers or a combination thereof are involved in the bearing.

According to the further development of the invention, the present invention also includes a multi-row anti-friction bearing with three rows of roller elements which are axially offset with regard to each other. Two of these rows comprise axial roller elements, i.e. roller elements to absorb axial forces, while the third row comprises radial roller elements for absorbing radial forces. This anti-friction bearing is furthermore characterized in that that bearing ring which consists of one piece is provided with a support wire having two race ways which cooperate with a row of axial roller elements and with a row of radial roller elements. The said bearing ring is furthermore provided with a support wire the sole race ring of which cooperates with said second row of axial roller elements. The multi-sectional race ring comprises three annular parts which are coaxially interconnected and each of which is opposite a respective row of roller elements provided with a support wire having a single race way.

The invention is illustrated by way of example in the accompanying drawings in which:

FIG. 1 diagrammatically illustrates a fragmentary axial section of a first embodiment of a bearing according to the invention.

FIG. 2 represents a fragmentary axial section of a second embodiment of a bearing according to the invention.

Figure 3:
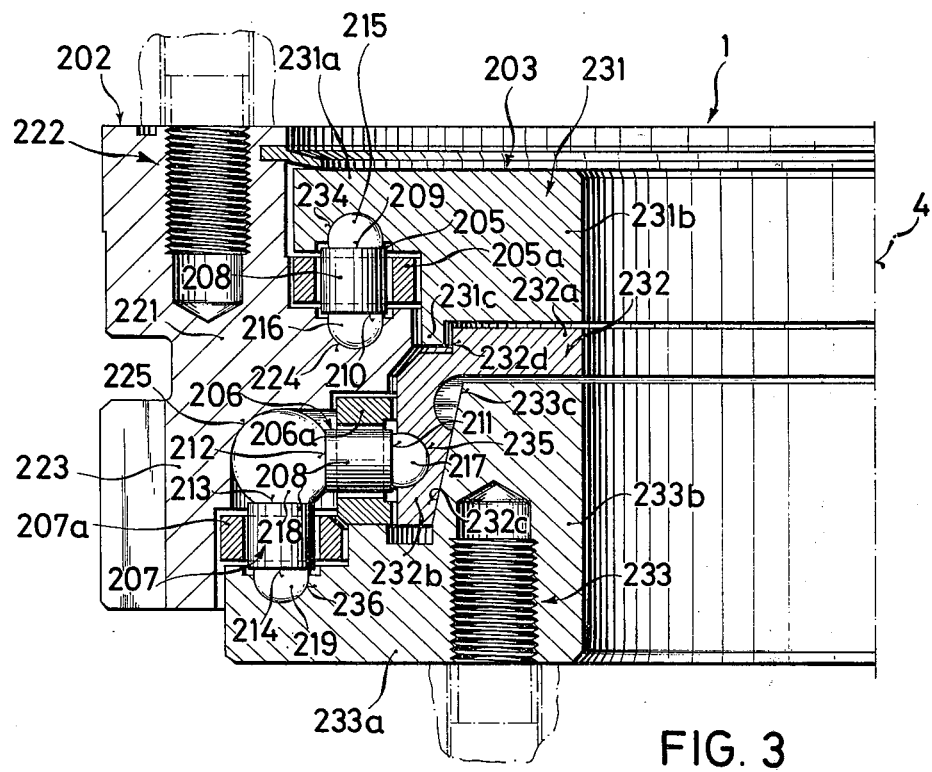
FIG. 3 shows by way of a fragmentary axial section a still further modification of a bearing according to the invention.
Figure 4:
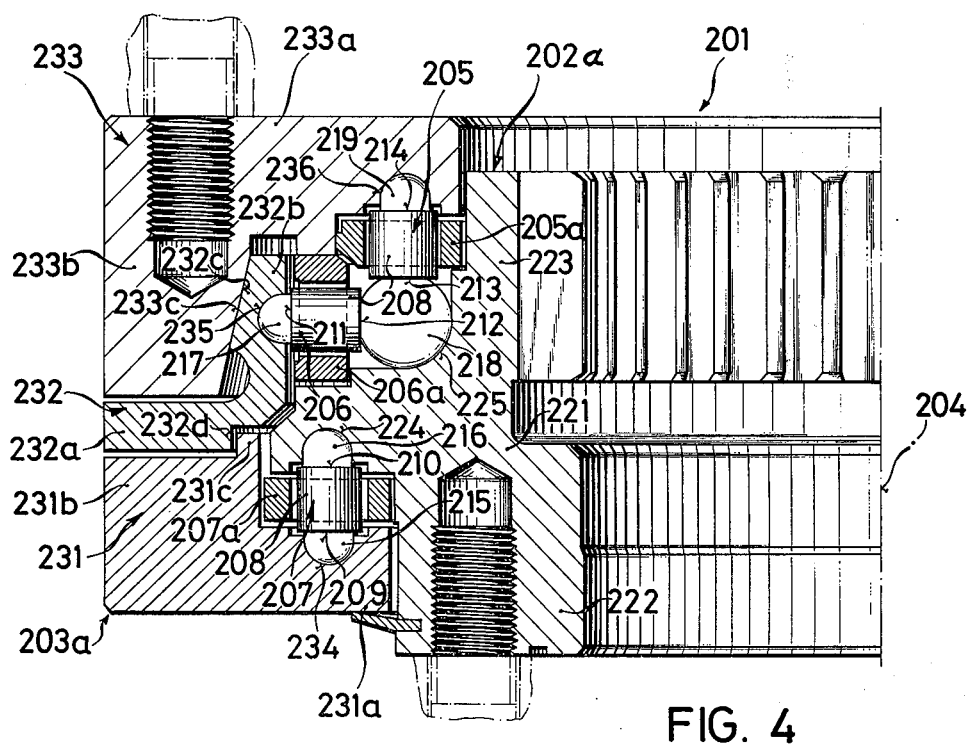
Figure 5:
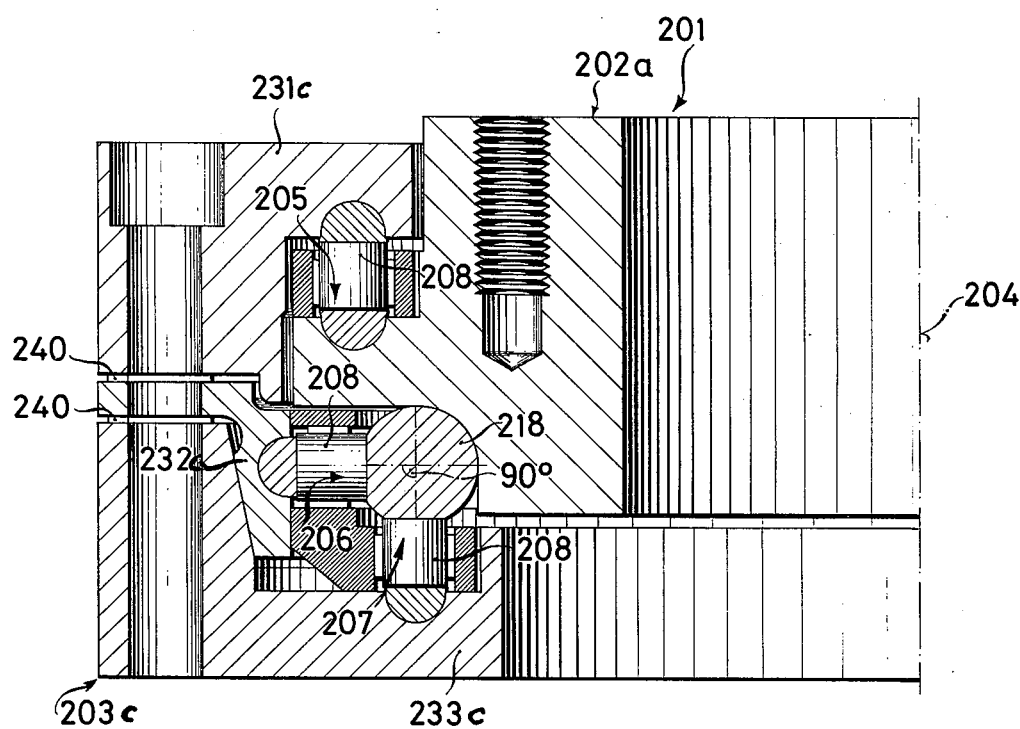

FIGS. 4 and 5 respectively illustrate two modifications of FIG. 3.

Referring now to the drawings in detail, the annular bearing 1 shown in FIG. 1, comprise two rows of rolling elements 2, 3, which latter may consist of cylindrical rollers, conical rollers, balls, or any other roller elements customary in anti-friction bearings. Each of said rows is arranged in a cage 2a, 3a, respectively, between two annular race ways 4 and 6 or 5 and 7. These race ways are provided on supporting wires 8, 9 and 10 arranged in a closed ring. One of the supporting wires in the specific showing of FIG. 1 — wire 8 — has two race ways 4, 5, whereas each of the other two supporting wires has only one race way 6 and 7 respectively. These rows of rolling elements 2, 3 and supporting wires 8, 9 and 10 are arranged in the bearing body 11 which comprises two bearing rings 12, 13 coaxially arranged relative to each other and one within the other. One of the two rings 12, 13 in the specific showing of FIG. 1 — the outer ring 12 — comprises two ring sections 12a and 12b which are coaxially superimposed upon each other and interconnected, e.g. by bolts 14. Each ring section 12a, 12b between a cylindrical coaxial bore 15, 16 and a plane face 17, 18 located at a right angle to the axis of bearing 19 and adjacent to the other ring section 12, 12a has an annular truncated cone-shaped surface 20, 21 which defines a truncated cone coaxial with the axis of the bearing 19 and tapering in the direction away from the other ring section 12b, 12a. The two truncated cone-shaped surfaces 20, 21 of the two corresponding ring sections form a double cone-shaped seat for the supporting wire 8 which is provided with two race ways 4, 5. The surfaces 20, 21 are tangential to the rounded surface of the wire 8. The two ring sections 12a, 12b respectively have a male and female annular shoulder by means of which they abut each other in axial relation to each other, thereby centering each other.

The inner bearing ring 13 comprises for example a crown with inner teeth 24 which may be in mesh with a gear (not shown). On its outside and opposite said double truncated cone-shaped seat 20, 21, the inner bearing ring 13 comprises an annular recess 25 defined by a cylindrical bottom surface 25a which is coaxial with the bearing axis 19, and by two annular lateral faces 25b, 25c which extend at a right angle to said axis 19. The connection with the rounded section 26, 27 between the cylindrical surface 25a and a lateral surface 25b or 25c is located opposite the truncated cone-shaped surface 20 or 21 of the ring section 12b or 12a which is farthest away from the respective connection and carries a supporting wire 9 or 10 with a single race way 6 or 7. If the rolling elements 2, 3 are cylindrical rollers, the race ways 4 to 7 are plane and parallel to one of the truncated cone-shaped surfaces 20, 21 which in the same manner as the plane race ways are inclined, preferably at an angle of 45° with regard to the bearing axis 19.

The basic concept of FIG. 2 is analogous to that of FIG. 1. The modification of FIG. 2 differs from that of FIG. 1 in that according to FIG. 2 the inner bearing ring 112 is composed of two ring sections 112a and 112b. Inasmuch as that part of the second embodiment which is not shown in FIG. 2, is symmetrical to the shown part of FIG. 2 with the axis 19 forming the axis of symmetry, and since the individual elements of FIG. 2 correspond to those of FIG. 1, the elements of FIG. 2 which correspond to those of FIG. 1 have been designated with the same reference numerals as in FIG. 1 but increased by 100.

It will be noted from FIG. 2 that the truncated cone-shaped surfaces 120 and 121 are now located on the outside of the inner ring 112a, 112b between an outer, cylindrical wall 115, 116 of the corresponding ring portion and the plane surface 117, 118 at a right angle with regard to the axis of bearing 19. In an analogous manner, the annular groove 125 which has arranged therein supporting wires 109, 110 located opposite the supporting wire 108 is provided in an outer bearing ring 113 on the inner side thereof.

When mounting the ring 12, 112 with two sections 12a, 12b, 112a, 112b, the play between the ring sections may be determined by means of intermediate wedges 28, 128. Due to the fact that both rows of rolling elements have the same angle of contact of 45°, the axial play and the radial play are determined at the same time.

The two-sectional ring is non-movably connected to the infrastructure of the vehicle by welding. The connection is realized by means of a non-illustrated chassis which is welded to other pieces of tempered steel. If the connecting area is not reheated in order to obtain a tension-free connection, possible tension in the connecting area will relieve itself prior to and during the use of the vehicle, especially in hilly terrain, or during intense movements of the vehicle in the manner of a rolling ship. These tensions freed after welding act upon the chassis in such a way that the support surface of the bearing is no longer plane and takes on a contour which is nearly sine-shaped. In spite of the defect in the planeness of the supporting surface the circular surface of the race ways of the rollers remains plane and the resistance moment or torque retains its initial magnitude.

Referring now to FIGS. 3 to 5, each of the annular bearings illustrated therein comprises a bearing ring 202 of a single piece and a multisectional bearing ring 203. These rings 202 and 203 are arranged one within the other and coaxially with regard to the bearing axis 204. According to the embodiment of FIG. 3, the single piece ring 202 is located at the outside of the multisectional ring 203, while, according to the embodiments of FIGS. 4 and 5 the said single piece ring 202 has been replaced by a ring 202a and is arranged in the interior of the multisectional bearing 203a. Between the two annular bearing rings 202 and 203 there are arranged axially offset with regard to each other three annular rows 205, 206, 207 of roller elements 208 so that the rollers, tapered rollers, balls, and other anti-friction bearing elements which are located in annular cages 205a, 206a, 207a and which are guided by annular race rings 209, 210, 211, 212, 213, 214 provided on the wire supports 215, 216, 217, 218, 219 are arranged in a closed ring. Of the three rows 205, 206, 207 of roller elements 208, the two outer rows 205 and 207 exclusively carry axial roller elements for absorbing axial forces, whereas the intermediate row 206 carries exclusively radial elements, for absorbing radial forces. One, in this specific case race way 112, of the two race ways 111, 112 is arranged on the support wire with two race ways 212, 213, while the other race way 211, is provided on a support wire 217. The second race way 213 of the support wire 218 serves as guiding means for the roller elements 208 of the outer row which is closest to the intermediate row 206. The outer row in the case of FIGS. 3 and 5 coomprises the outer lower row 207 and in the case of FIG. 4 comprises the outer upper row 205.

The single piece race ring 202a carries the support wire 218 with the two race ways 212 and 213 and the support wire with the single race way 214 for that row of roller elements which is the farthest from the intermediate row 206 (row 205 in FIGS. 3 and 5 and row 207 in FIG. 4). The multisectional bearing ring 203a is composed of three annular parts 231, 232, 233, which are arranged coaxially with regard to each other and are interconnected by means of bolts or the like (not illustrated). Each of the parts 231, 232, and 233 is associated with one of the three rows 205, 206 and 207 respectively of the roller elements 208 and comprises opposite a corresponding row 205, 206 or 207 a recess or seat for one of the support wires 215, 217, or 219 with a single race way. The two outer parts 231 and 233 of ring 203a each represent an outer annular collar or clamp 231a and 233a which covers the outer corresponding row 205 or 206 of the roller elements 208. According to the illustrated embodiment of the present invention, the outer collar 231a is arranged above (FIGS. 3 and 5) or below the corresponding row 205 or 207 respectively. Each of the two outer parts 231 and 233 has a cylindrical extension 231b and 233b which extend in the direction toward the other outer part 233 and 231 and enclose with the latter the annular disc 232a of the intermediate part 232. The three parts 231, 232 and 233 of the bearing ring 203 define an annular void into which extends an annular median or central collar 221 of the single piece ring 202a. The two cylindrical extensions 222 and 223 of the ring 202a, which extend from one part to the other part of the collar 221 define therewith and with the parts 231, 232, and 233 of the multisectional ring, two annular seats. In one of these seats there is located a supporting wire 218 and two rows of the roller elements 206, 207 (FIGS. 3 and 5) or 205 and 206 (FIG. 4), whereas in the other one of said seats there is provided the second outer row 205 (FIGS. 3 and 5) or 207 (FIG. 4). On one of its faces perpendicular to the bearing axis 204, the collar 221 is provided with an annular seat 224 for the support wire 216 with the single race way. By means of its other end face which is perpendicular to the axis of the bearing 204, the collar 221 defines with the cylindrical wall adjacent to the corresponding cylindrical extension 223 which extends downwardly (FIGS. 3 and 5) or extends upwardly (FIG. 4) an annular groove or seat 225 for the support wire 218 with two race ways. The annular disc 232a is axially extended in downward direction (FIGS. 3 and 5) or in upward direction (FIG. 4) by means of an annular outer skirt 232b (FIG. 3) or an inner skirt (FIGS. 4 and 5) with regard to the above mentioned disc 232a and is coaxial with regard to the axis bearing 204. This skirt 232b extends opposite the intermediate row 206 of the roller elements 208 and furnishes the annular seat 235 for the support wire 217 with the single race way. This race way 217 is provided at the same level as the support wire which additionally carries roller element 212 for the intermediate range of a radial roller type, the race way 213 for the outer row 207 (FIGS. 3 and 5) or 205 (FIG. 4) of the axial roller type. On that face of the skirt 232b which faces away from the intermediate rows 206 and seat 215 for the support wire 217, the skirt 232b has a truncated cone-shaped region 232c which engages a truncated cone-shaped supporting surface 233c of the axial cylindrical extension 233b of the outer part 233 of the bearing ring 203. The truncated cone part 232c and the supporting surface 233c have the same conicity which is relatively slight with regard to the bearing axis 204 and preferably is only of the order of a few degrees.

The cylindrical extension 231b of the outer part 231 is provided opposite the annular disc 232a with an annular male shoulder or female shoulder 231c which engages a female or male shoulder 232d provided on the annular disc 231b of the part 232 of the multisectional bearing. The axial play between the parts 231, 232, and 233 of ring 203 and between 231c, 232c, and 233c of ring 203c is controlled by means of an annular key or wedge 240 (FIG. 5) which is provided between the annular disc 232a, 232c of one part and the cylindrical extensions 231b, 231c of 233b, 233c of the other part.

It is, of course, to be understood that the present invention is, by no means, limited to the specific showing in the drawings but also comprises any modifications within the scope of the appended claims.

What we claim is:

1. In an anti-friction precision bearing preloaded for absorbing simultaneously radial and axial forces and torque stresses: an annular bearing body comprising in combination an inner bearing ring and an outer bearing ring, one of said bearing rings being divided into at least two axially superimposed individual sections and having its plane of division extending transverse to the axis of said anti-friction bearing, the other one of said bearing rings being an undivided single ring, at least two annular rows of anti-friction elements arranged between said inner and outer bearing rings, at least three annular supporting wire means arranged between said inner and outer rings and forming the raceways for said rows of anti-friction elements, two of said wire means being arranged in said undivided single ring and each one of said two wire means having one raceway only, and the third one of said wire means having two raceways and being seated between two of said at least two axially superimposed individual bearing ring sections, those anti-friction elements which cooperate with the wire element having two raceways having their axes of rotation respectively extending substantially perpendicular to said last mentioned two raceways, and connecting means interconnecting said superimposed bearing sections.

2. In an anti-friction precision bearing preloaded for absorbing simultaneously radial and axial forces and torque stresses: an annular bearing body comprising in combination an inner bearing ring and an outer bearing ring, one of said bearing rings being divided into at least two axially superimposed individual sections and having its plane of division extending transverse to the axis of said anti-friction bearing, the other one of said bearing rings being an undivided single ring, at least two annular rows of anti-friction elements arranged between said inner and outer bearing rings, at least three annular supporting wire means arranged between said inner and outer rings and forming the raceways for said rows of anti-friction elements, two of said wire means being arranged in said undivided single ring and each one of said two wire means having one raceway only, and the third one of said wire means having two raceways and being seated between two of said at least two axially superimposed individual bearing ring sections, and connecting means interconnecting said superimposed bearing sections.

3. An anti-friction bearing in combination according to claim 2, in which each of said two individual bearing sections between which said wire means having two raceways is arranged has a conical surface contacting said last mentioned wire means, each of said conical surfaces forming an acute angle with said plane of division, and both of said conical surfaces defining with each other an annular groove of V-shaped cross section.

4. An anti-friction bearing in combination according to claim 3, in which said angle formed by each of said conical surfaces with said plane of division is 45°.

5. An anti-friction bearing in combination according to claim 3, in which said divided bearing ring forming said two bearing ring sections forms the outer bearing ring with conical surfaces thereof provided on the inner periphery of said divided bearing ring, and in which the outer periphery of said undivided single ring has an annular groove having said wires with a single raceway only seated in said annular groove, said annular groove being located opposite said last mentioned conical surfaces.

6. An anti-friction bearing in combination according to claim 3, in which said divided bearing ring forming said two bearing ring sections forms the inner bearing ring with the conical surfaces thereof provided on the outer periphery of said divided bearing ring, and in which the inner periphery of said undivided single ring has an annular groove having said wires with a single raceway only seated in said annular groove, said annular groove being located opposite said last mentioned conical surfaces.

7. An anti-friction bearing in combination to claim 3, in which the raceway of each wire means having one raceway only and the raceways of the wire means having two raceways are respectively parallel to said conical surfaces.

8. In an anti-friction precision bearing preloaded for absorbing simultaneously radial and axial forces and torque stresses, an annular bearing body comprising in combination an inner bearing ring and an outer bearing ring, one of said bearing rings being divided into three axially superimposed individual sections and having its plane of division extending transverse to the axis of said anti-friction bearing, the other one of said bearing rings being an undivided single bearing ring, three annular rows of anti-friction elements axially offset with regard to each other and arranged between said inner and outer bearing rings, two of said annular rows of anti-friction elements comprising anti-friction elements arranged for absorbing axial stresses and the third row of said annular friction elements comprising anti-friction elements for absorbing radial stresses, and five annular supporting wire means arranged between said inner and outer bearing rings and forming the raceways for said rows of anti-friction elements, said undivided single bearing ring being provided with one supporting wire means having two raceways, respectively cooperating with one of said rows of anti-friction elements for absorbing axial forces and with one of said rows of anti-friction elements for absorbing radial forces, said undivided single bearing ring also being provided with an annular supporting wire means having a single raceway cooperating with said second row of anti-friction elements for absorbing axial forces, said divided bearing ring comprising three annular sections arranged coaxially with regard to each other, and connecting means interconnecting said last mentioned three axially superimposed sections, the axes of rotation of said anti-friction elements cooperating with said one supporting wire means having two raceways respectively being substantially perpendicular to said last mentioned two raceways.

9. An anti-friction bearing in combination according to claim 8, in which the row of anti-friction elements for absorbing radial forces is arranged between two rows of anti-friction elements for absorbing axial forces.

10. An anti-friction bearing in combination according to claim 8, in which the bearing ring divided into three axially superimposed individual sections has a circumferential approximately central void, and in which the undivided single bearing ring has a circumferential approximately central annular collar extending into said void and also has at said collar a surface extending transverse to the axis of said bearing and forming a seat for said wire means with two races while the opposite side of said collar forms a seat for one of the wire elements having a single raceway only.

11. An anti-friction bearing in combination according to claim 10, in which said two axially outer bearing sections of said divided bearing ring respectively cover opposite sides of said approximately central collar while respectively forming a seat for a wire element with a single raceway.

12. An anti-friction bearing in combination according to claim 11, in which the approximately central portion of the divided bearing ring includes an annular disc arranged between the axially outer sections of said divided bearing ring and provided with an annular skirt coaxial with said disc and arranged opposite the intermediate row of anti-friction elements while forming a seat for a supporting wire with a single race ring.

13. An anti-friction bearing in combination according to claim 12, in which that outer bearing section which is within the vicinity of the wire element with two race ways is provided with an axial extension opposite to and in engagement with said annular skirt along complementary conical surfaces extending in the axial direction of said anti-friction bearing.

14. An anti-friction bearing in combination according to claim 13, in which said conical surfaces define with the axis of said bearing an angle within the range of from 1° to 15°.

15. An anti-friction bearing in combination according to claim 12, in which that outer bearing section which is remote from said wire element having two raceways has a cylindrical extension extending in the direction toward said annular disc and is provided with a shoulder, said disc likewise being provided with a shoulder engaging said first mentioned shoulder.

* * * * *